US011336995B2

(12) United States Patent
Litovsky et al.

(10) Patent No.: US 11,336,995 B2
(45) Date of Patent: May 17, 2022

(54) DIRECTIONAL ACOUSTIC RADIATING DEVICE

(71) Applicant: Bose Corporation, Framingham, MA (US)

(72) Inventors: Roman N. Litovsky, Newton, MA (US); Chester Smith Williams, Lexington, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/820,154

(22) Filed: Mar. 16, 2020

(65) Prior Publication Data

US 2021/0289289 A1 Sep. 16, 2021

(51) Int. Cl.
*H04R 1/40* (2006.01)
*H04R 1/02* (2006.01)
*B62J 3/00* (2020.01)
*H04R 1/30* (2006.01)

(52) U.S. Cl.
CPC ............... *H04R 1/403* (2013.01); *B62J 3/00* (2013.01); *H04R 1/025* (2013.01); *H04R 1/30* (2013.01); *B62K 2202/00* (2013.01); *H04R 2499/13* (2013.01)

(58) Field of Classification Search
None
See application file for complete search history.

(56) References Cited

U.S. PATENT DOCUMENTS

| 4,974,759 A * | 12/1990 | McDonough | B62J 45/10 224/443 |
|---|---|---|---|
| 8,351,630 B2 | 1/2013 | Ickler et al. | |
| 8,358,798 B2 | 1/2013 | Ickler et al. | |
| 8,447,055 B2 | 5/2013 | Jankovsky et al. | |
| 2004/0105559 A1* | 6/2004 | Aylward | H04R 5/02 381/103 |
| 2009/0274329 A1* | 11/2009 | Ickler | G10K 11/26 381/338 |
| 2016/0059920 A1* | 3/2016 | Takanashi | B62J 45/10 74/551.8 |
| 2017/0134837 A1* | 5/2017 | Rosen | H04R 1/345 |
| 2020/0130771 A1* | 4/2020 | Jacobsz Rosier | B62K 23/02 |
| 2021/0029385 A1* | 1/2021 | Lee | H04N 21/4788 |

* cited by examiner

*Primary Examiner* — Walter F Briney, III
(74) *Attorney, Agent, or Firm* — Brian M. Dingman; Dingman IP Law, PC

(57) ABSTRACT

A system includes a micro-mobility device that is configured to support a user on a mechanical structure of the micro-mobility device and a directional acoustic radiating device carried by the mechanical structure of the micro-mobility device and comprising a first acoustic driver that is acoustically coupled to a first passive directional device so as to radiate acoustic energy into the first passive directional device. The first passive directional device comprises an opening in a perimeter of the first passive directional device that extends along a length of the first passive directional device and through which acoustic energy is radiated to an environment to provide a direction of maximum radiation of the first passive directional device.

19 Claims, 9 Drawing Sheets

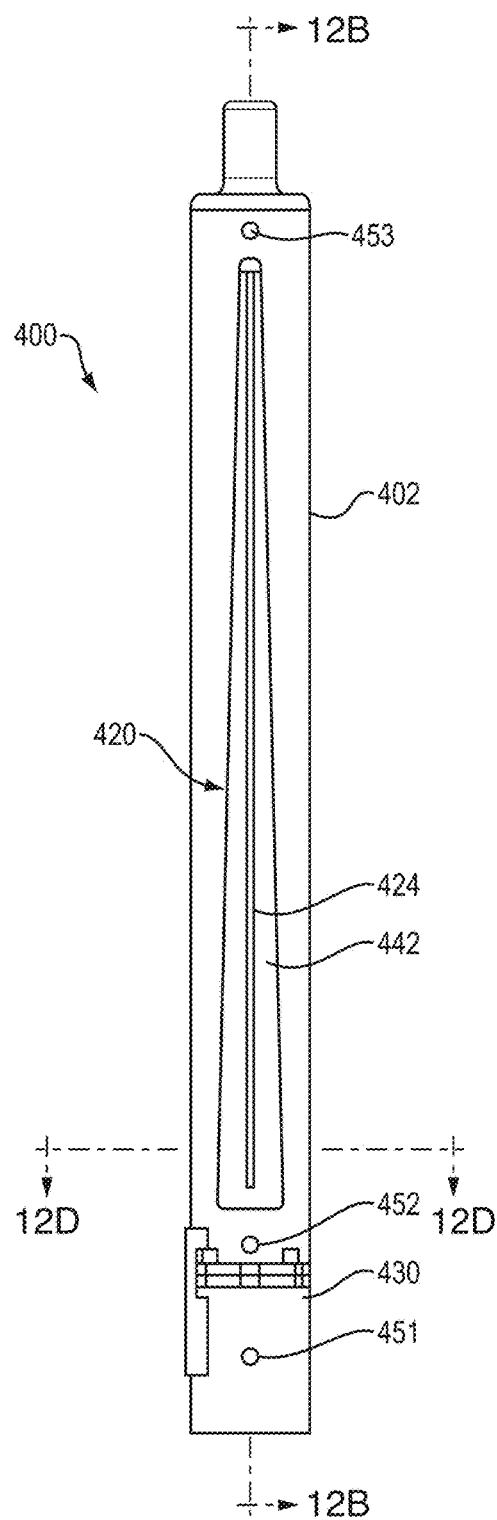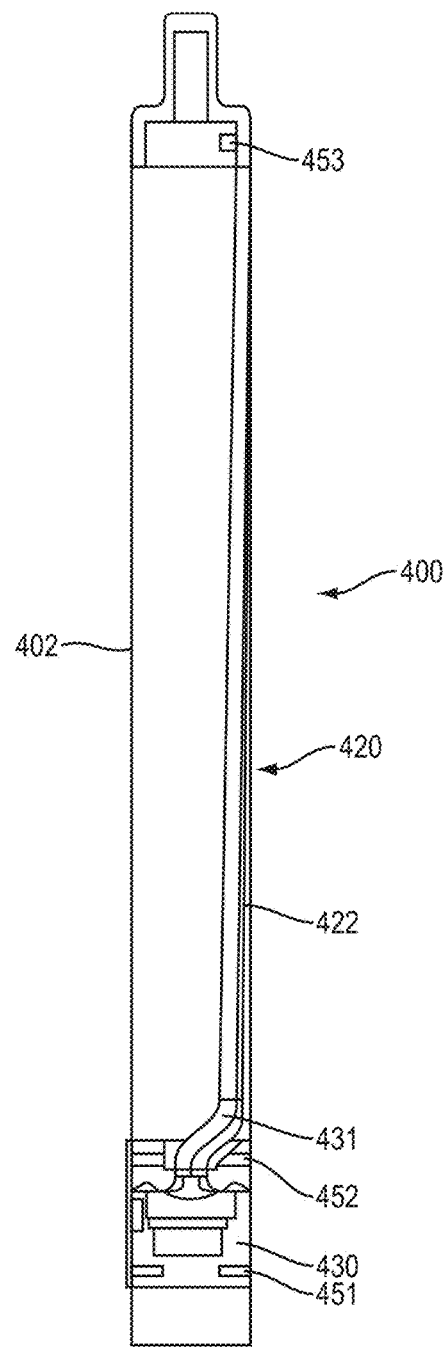
FIG. 12A
FIG. 12B

DIRECTIONAL ACOUSTIC RADIATING DEVICE

BACKGROUND

This disclosure relates to a passive directional acoustic radiating device that can be used with a micro-mobility device.

Micro-mobility devices have one or more wheels and a mechanical structure carried by the wheels. The mechanical structure either directly or indirectly supports a seated or standing user. Examples of micro-mobility devices include but are not limited to motorized scooters, motorized bicycles, motorized skateboards, and self-balancing devices such as unicycles and two-wheeled personal transporters. Providing sound to the user of a micro-mobility device can be desirable, for example to provide turn-by-turn directions.

SUMMARY

All examples and features mentioned below can be combined in any technically possible way.

In one aspect, a system includes a micro-mobility device that is configured to support a user on a mechanical structure of the micro-mobility device and a directional acoustic radiating device carried by the mechanical structure of the micro-mobility device and comprising a first acoustic driver that is acoustically coupled to a first passive directional device so as to radiate acoustic energy into the first passive directional device. The first passive directional device comprises an opening in a perimeter of the first passive directional device that extends along a length of the first passive directional device and through which acoustic energy is radiated to an environment, to provide a direction of maximum radiation of the first passive directional device.

Some examples include one of the above and/or below features, or any combination thereof. In some examples the direction of maximum radiation of the first passive directional device is pointed toward a location above the mechanical structure of the micro-mobility device. In an example the micro-mobility device comprises a motorized scooter that comprises a deck and a handlebar stem coupled to and extending upward of the deck, and the first passive directional device is coupled to the handlebar stem. In an example the micro-mobility device comprises a motorized scooter that comprises a deck and a handlebar stem coupled to and extending upward of the deck, and the first passive directional device is an integral part of the handlebar stem. In an example the micro-mobility device comprises a motorized scooter that comprises a deck and a handlebar stem coupled to and extending upward of the deck to an upper end of the handlebar stem, and the first passive directional device has a distal end located proximate the upper end of the handlebar stem. In some examples the system further comprises a phase plug located between the first acoustic driver and the first passive directional device to better match an impedance of the first acoustic driver to an impedance of the first passive directional device.

Some examples include one of the above and/or below features, or any combination thereof. In some examples the first acoustic driver radiates front side acoustic energy from a front side and rear side acoustic energy from a rear side, and the front side acoustic energy is radiated into the first passive directional device. In an example the directional acoustic radiating device further comprises a waveguide that receives rear side acoustic energy. In an example the first passive directional device has a distal end spaced from the first acoustic driver, and the waveguide comprises an outlet opening located proximate the distal end of the first passive directional device. In some examples the system further comprises a second acoustic driver that is acoustically coupled to a second passive directional device so as to radiate acoustic energy into the second passive directional device, wherein the second passive directional device comprises an opening in a perimeter of the second passive directional device that extends along a length of the second passive directional device and through which acoustic energy is radiated to an environment to provide a direction of maximum radiation of the second passive directional device, wherein the direction of maximum radiation of the second passive directional device is pointed generally at an expected location of the head of the user of the micro-mobility device.

Some examples include one of the above and/or below features, or any combination thereof. In some examples the direction of maximum radiation of the first passive directional device is pointed generally at an expected location of a first ear of the user, and the direction of maximum radiation of the second passive directional device is pointed generally at an expected location of a second ear of the user. In some examples the second acoustic driver radiates front side acoustic energy from a front side and rear side acoustic energy from a rear side, and the front side acoustic energy is radiated into the second passive directional device. In an example the directional acoustic radiating device further comprises a waveguide that receives rear side acoustic energy from the first and second drivers. In an example the first passive directional device has a distal end spaced from the first acoustic driver, the second passive directional device has a distal end spaced from the second acoustic driver and located proximate the distal end of the first passive directional device, and the waveguide comprises an outlet opening located proximate the distal ends of the first and second passive directional devices. In an example the waveguide is located between the first passive directional device and the second passive directional device. In some examples the system further comprises a controller that is configured to manipulate a phase of the acoustic energy radiated by the first and second drivers such that the first and second drivers are in phase at low frequencies.

Some examples include one of the above and/or below features, or any combination thereof. In some examples the system further comprises a third acoustic driver that radiates front side acoustic energy from a front side and rear side acoustic energy from a rear side, and the rear side acoustic energy is radiated into a first waveguide located between the first and second passive directional devices. In an example the rear side acoustic energy from the third acoustic driver is radiated into a second waveguide located between the first and second passive directional devices. In an example the first passive directional device has a distal end spaced from the first acoustic driver, the second passive directional device has a distal end spaced from the second acoustic driver and located proximate the distal end of the first passive directional device, the first waveguide comprises an outlet opening located proximate the distal ends of the first and second passive directional devices, and the second waveguide comprises an outlet opening located proximate the distal ends of the first and second passive directional devices.

In another aspect a directional acoustic radiating device includes an assembly configured to attach to a micro-mobility device, the assembly comprising a first acoustic driver that is acoustically coupled to a first passive directional device so as to radiate acoustic energy into the first passive directional device, wherein the first passive directional device comprises an opening in a perimeter of the first passive directional device that extends along a length of the first passive directional device and through which acoustic energy is radiated to an environment to provide a direction of maximum radiation of the first passive directional device, and a second acoustic driver that is acoustically coupled to a second passive directional device so as to radiate acoustic energy into the second passive directional device, wherein the second passive directional device comprises an opening in a perimeter of the second passive directional device that extends along a length of the second passive directional device and through which acoustic energy is radiated to an environment to provide a direction of maximum radiation of the second passive directional device. A controller is configured to manipulate a phase of the acoustic energy radiated by the first and second drivers. In an example the assembly further comprises a waveguide that receives acoustic energy from at least one of the first and second drivers.

BRIEF DESCRIPTION OF THE DRAWINGS

FIGS. 12A-12D illustrate a directional acoustic radiating device that is integrated into the handlebar stem of a motorized scooter, where FIG. 12A is a top view, FIG. 12B is a longitudinal cross-section taken along line 12B-12B of FIG. 12A, FIG. 12C is a perspective view of the directional acoustic radiating device of FIGS. 12A and 12B, and FIG. 12D is a cross-section taken along line 12D-12D of FIG. 12A.

DETAILED DESCRIPTION

Sound can be provided to the user of a micro-mobility device by coupling a directional acoustic radiating device to the mechanical structure of the micro-mobility device. The directional acoustic radiating device includes an acoustic driver that is acoustically coupled to a passive directional device so as to radiate acoustic energy into the passive directional device. The passive directional device has an opening in a perimeter of the passive directional device that extends along a length of the passive directional device and through which acoustic energy (sound) is radiated to an environment, to provide a direction of maximum radiation of the passive directional device. The passive directional device will provide increasing sound directivity at higher frequencies. In general, the emitted sound is directional at frequencies that are greater than the speed of sound divided by two times the length of the passive directional device. Thus the greater the length of the passive directional device the lower the frequency above which some directivity is provided. The directional acoustic radiating device can be configured such that the direction of maximum radiation of the passive directional device is pointed at a location where the head of the user of the micro-mobility device is expected to be. In this way sound can be preferentially delivered to the user of the micro-mobility device, with less sound spilled to other people who might be near the user.

Figure 1:
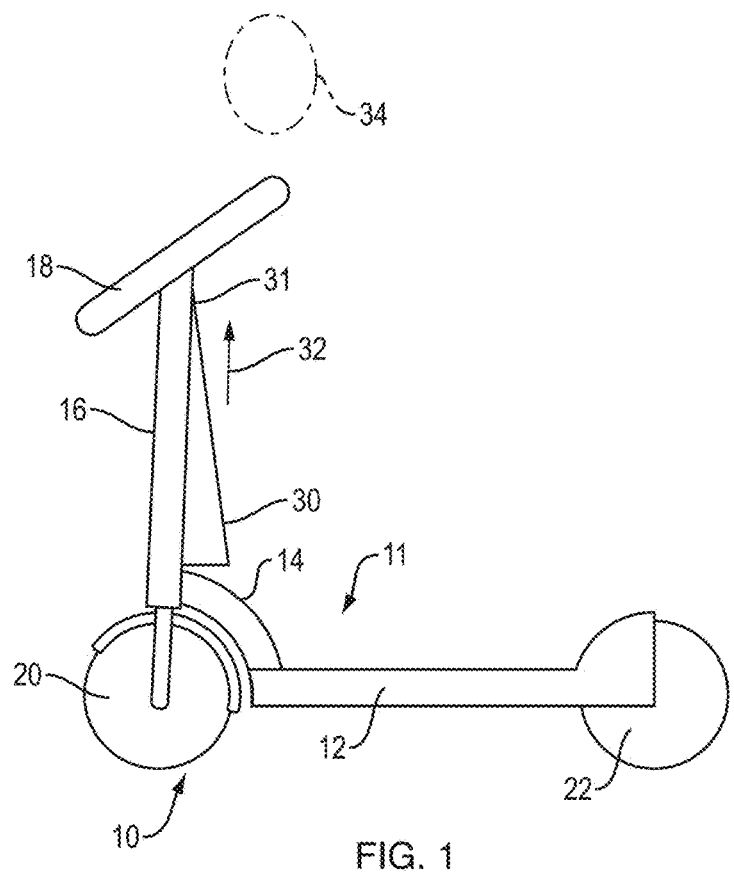
FIG. 1 illustrates a system with a directional acoustic radiating device carried by a motorized scooter.

FIG. 1 illustrates system 10 that includes micro-mobility device 11 that is configured to support a user on a mechanical structure of the micro-mobility device, and directional acoustic radiating device 30 that is carried by the mechanical structure of the micro-mobility device. As described in more detail below, directional acoustic radiating device 30 includes an acoustic driver that is acoustically coupled to a passive directional device so as to radiate acoustic energy into the passive directional device. The passive directional device has an opening in a perimeter of the passive directional device that extends along a length of the passive directional device and through which acoustic energy is radiated to an environment, to provide a direction of maximum radiation 32 of the passive directional device. Passive directional acoustic radiating devices are known in the field, for example as disclosed in U.S. Pat. No. 8,351,630, the entire disclosure of which is incorporated by reference herein for all purposes.

A micro-mobility device is a powered wheeled personal transport device. Non-limiting examples of micro-mobility devices include motorized scooters, motorized bicycles, motorized skateboards, and self-balancing devices such as motorized unicycles and two-wheeled personal transport devices (such as the Segway® personal transport device). Micro-mobility devices include a mechanical structure that is configured to support the user in a standing or seated position. For example, motorized scooter 11 includes the following mechanical structure: deck 12 is supported by wheels 20 and 22. Handlebar stem 16 carries at its top end handlebars 18. Handlebar stem 16 is connected to deck 12 by deck to stem connector 14. Directional acoustic radiating device 30 is carried by this mechanical structure. In an example directional acoustic radiating device 30 is fixed to handlebar stem 16. In another example the directional acoustic radiating device is at least partially integrated into the handlebar stem.

In an example the direction of maximum acoustic radiation 32 is pointed generally at location or area 34, which is above the mechanical structure of the micro-mobility device. In an example location 34 is, generally, the expected location of the head of a user of micro-mobility device 11. Since the manufacturer of micro-mobility device 11 will not know or have control over who uses the device or how the user will sit or stand on the device, there is no way to know with certainty the actual location of the head of the user. However, in normal use situations, and with persons in known size ranges, it is possible to estimate the expected location of the head. Since the passive directional device of directional acoustic radiating device 30 has a direction of maximum acoustic radiation, it follows that in other directions there is less acoustic radiation. Directional acoustic radiating device 30 is thus configured to preferentially direct acoustic radiation (sound) in a direction, represented by arrow 32. If the user's ears are in a volume that overlaps with direction 32, the user will hear the radiated sound preferentially as compared to other people who are not in or close to volume 34.

In the example illustrated in FIG. 1 directional acoustic radiating device 30 is coupled to or carried by handlebar stem 16. Any of the directional acoustic radiating devices disclosed or contemplated herein, including but not limited to device 30, FIG. 1, can be coupled to, carried by, or integrated into the mechanical structure of the micro-mobility device in any desired manner. In some examples the directional acoustic radiating device is attached to the mechanical structure by snaps, clips, straps, bolts, fasteners, compression fittings or the like. In some examples the directional acoustic radiating device is coupled to the handlebar stem by straps that encircle the directional acoustic radiating device and the handlebar stem. In other examples the directional acoustic radiating device includes two portions that mate on opposing sides of the shaft and accomplish a compression fit relative to the shaft, to prevent vertical and rotational movement relative to the shaft. In other examples fasteners such as screws or bolts that are carried by the directional acoustic radiating device can be received directly into the handlebar stem or other part of the mechanical structure of the micro-mobility device to which the directional acoustic radiating device is coupled. When integrated into the mechanical structure of the micro-mobility device, the directional acoustic radiating device can comprise an internal structure that is configured to conduct sound pressure along its length and defines an elongated sound-emitting opening that is open to the external environment.

In an example the distal end 31 of directional acoustic radiating device 30 is located close to, at, or below the upper end of handlebar stem 16 so as not to interfere with the use of handlebars 18 or otherwise compromise the use of micro-mobility device 11. Another advantage of this orientation is that the acoustic transducer (driver) can be located on or close to deck 12 and thus close to the battery power source that is typically housed within deck 12; the battery power source can be used to power the driver and any other electrically-operated components of the directional acoustic radiating device, such as a processor and other audio-processing electronics. In another example the directional acoustic radiating device is partially integrated into the handlebar stem of the scooter. In other examples directional acoustic radiating device 30 is carried by one or more other portions of the mechanical structure of the micro-mobility device.

In other examples, for a motorized scooter the directional acoustic radiating device can be carried by or incorporated into the deck. For a motorized bicycle the directional acoustic radiating device can be carried by or incorporated into any frame member, such as a front or rear wheel fork, a top tube, down tube, seat tube, or head tube, For a motorized skateboard the directional acoustic radiating device can be carried by or incorporated into the deck. For a motorized unicycle and a two-wheeled personal transport device the directional acoustic radiating device can be carried by or incorporated into any of the device's structural members.

In some examples the directional acoustic radiating device is carried by the micro-mobility device such that its passive directional device is configured and oriented so that its direction of maximum radiation is pointed generally at the expected location of the head of the user. In examples where the directional acoustic radiating device comprises separate left and right outputs, the left output can be pointed generally at the expected location of the left ear of the user and the right output can be pointed generally at the expected location of the right ear of the user.

Figure 2:
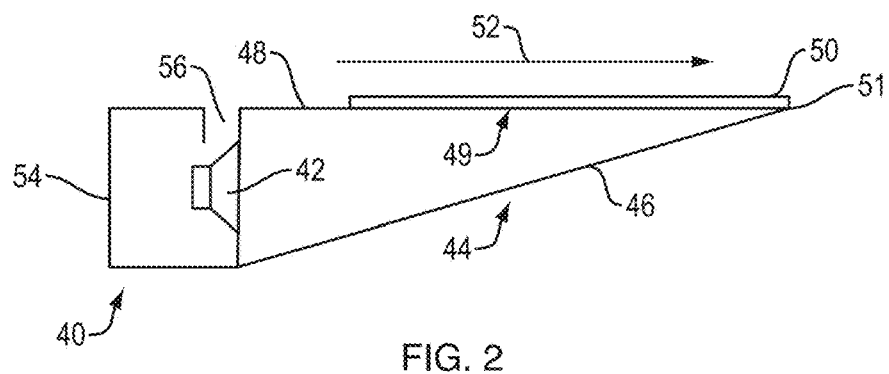
FIG. 2 is a schematic diagram of a directional acoustic radiating device.

FIG. 2 illustrates directional acoustic radiating device 40 that includes driver 42 that is acoustically coupled to passive directional device 44. The sources of power and acoustic signals for driver 42 are not shown, simply for the sake of clarity of illustration. In an example the front side acoustic energy of driver 42 is radiated into the interior of passive directional device 44. In an example passive directional device 44 is tapered in width from driver 42 to distal end 51, which in this example is accomplished with straight wall 48 and angled wall 46. Longitudinal opening 49 extends along a length of the passive directional device. Acoustic energy in passive directional device 44 is radiated to the environment through opening 49. In an example opening 49 is made resistive by covering the opening with a resistive material 50. Port 56 that is open to driver rear acoustic volume 54 is used to create a dipole operation below the tuning frequency of port 56. At frequencies that are well above this port tuning frequency directional acoustic radiating device 40 operates in a monopole mode, with an acoustic directivity schematically indicated by arrow 52. The shape, size, length, and diameter of the passive directional device and its sound-emitting opening(s) can be selected to accomplish a desired sound directionality, and to accommodate a particular micro-mobility device mechanical structure to which the passive directional device is coupled or into which some or all of the passive directional device is integrated.

Directional acoustic radiating device 40 can be coupled to or integrated into the mechanical structure of a micro-mobility device such that direction 52 is generally toward the likely or expected location of the head or one or both ears of a user. Directional acoustic radiating device 40 can be configured such that sound in a desired frequency range (such as a speech range or a music range) is directed. Lower frequency sounds may have wavelengths that are too long relative to the length of opening 49 to cancel in free air, and so lower frequency sounds may not be directed by directional acoustic radiating device 40. Accordingly, in an example the directionality of directional acoustic radiating device 40 extends generally above a threshold frequency. A result of the directionality is that speech or music played through driver 42 is more preferentially heard by the user and less preferentially heard by other people who are located nearby. The directional acoustic radiating device can be used to deliver sound to the user of the micro-mobility device, while spilling less sound to others. The directional acoustic radiating device can thus be used to deliver sound meant for the user and not others, such as turn-by-turn directions from a map app or music or other audio from the user's mobile device, without the need for the user to wear headphones and without the need to mount one or more acoustic drivers to the handlebars of the micro-mobility device.

Figure 3:
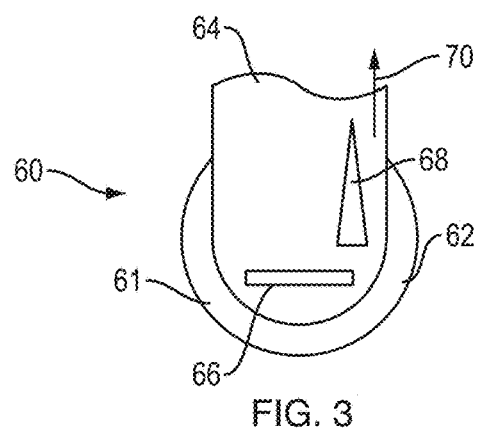
FIG. 3 illustrates a system with a directional acoustic radiating device carried by a motorized unicycle.

FIG. 3 illustrates a system 60 that is part of a motorized unicycle micro-mobility device 61 that comprises wheel 62 and a mechanical structure comprising frame 64 and foot support 66. Directional acoustic radiating device 68 is carried by frame 64 and configured such that its direction of maximum sound radiation, indicated by arrow 70, is up, toward the expected location of the head of a person using micro-mobility device 61.

Figure 4:
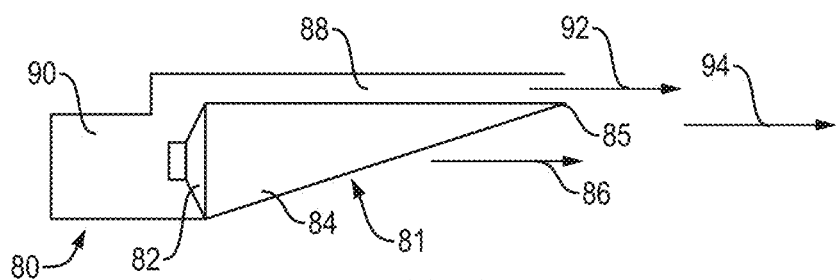
FIG. 4 is a schematic diagram of a directional acoustic radiating device.

FIG. 4 illustrates directional acoustic radiating device 80 wherein the back side of a full range driver is loaded with a low frequency waveguide having its end opening near the distal end point 85 of the passive directional device, which would typically be the closest point to the ears of the rider. The waveguide enhances the low frequencies. Directional acoustic radiating device 80 comprises driver 82 that has the acoustic output from one side coupled into interior volume 84 of passive directional device 81. Passive directional device 81 has a direction of maximum radiation indicated by arrow 86. The back side of driver 82 is coupled into volume 90 that leads to waveguide 88 with acoustic outlet 92. The sound from both sides of the driver will combine as indicated by arrow 94. This configuration is configured to enhance low frequencies and may thus be well suited to playing sound with a broad dynamic range, such as most music.

Figure 5:
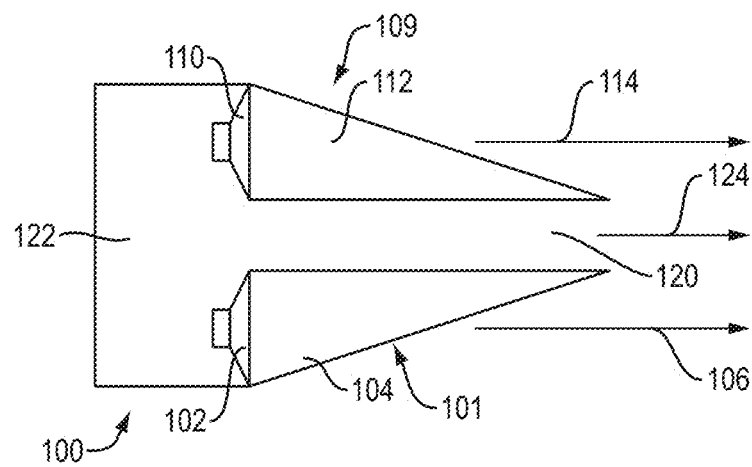
FIG. 5 is a schematic diagram of a directional acoustic radiating device.

FIG. 5 illustrates a directional acoustic radiating device that includes two full-range acoustic drivers, each radiating from one side into its own passive directional device and each radiating from the other side into a common waveguide that helps to boost low frequencies. In an example, below a defined frequency both full range drivers are controlled such that they radiate in phase, for maximum bass reproduction. This accomplishes a full range single band system. Directional acoustic radiating device 100 includes separate drivers 102 and 110. One side (in an example, the front side) of driver 102 is acoustically coupled into the interior volume 104 of passive directional device 101 which has a direction of maximum radiation 106. One side (in an example, the front side) of driver 110 is acoustically coupled into the interior volume 112 of passive directional device 109 which has a direction of maximum radiation 114. The other sides (the rear sides) of both drivers are coupled into volume 122 of waveguide 120 with outlet 124 that is located proximate the distal ends of passive directional devices 101 and 112. Phase control of the drivers is accomplished with a controller such as controller 254, FIG. 9.

Figure 6:
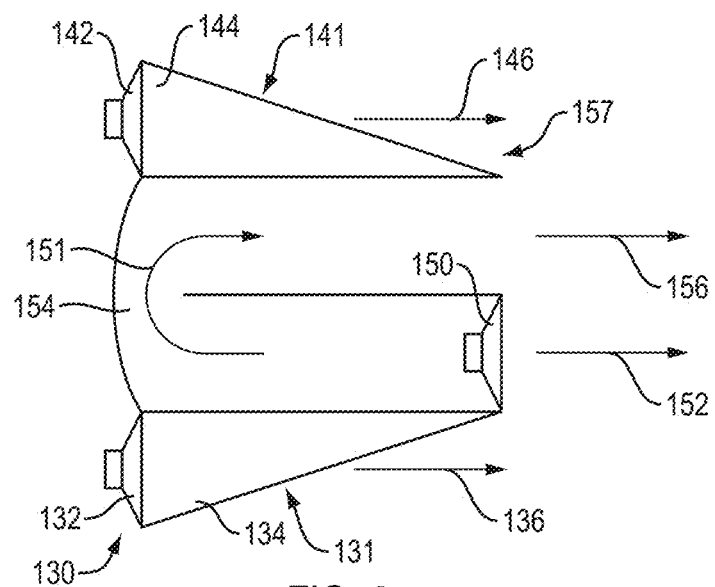
FIG. 6 is a schematic diagram of a directional acoustic radiating device.

FIG. 6 illustrates a directional acoustic radiating device that can be used to accomplish a dual-band system with two smaller-size drivers that are more optimized for use in passive directional devices, and one dedicated bass/mid-bass driver with its back side loaded by a waveguide. In an example there is an additional volume (not shown) behind the bass/mid-bass driver for tuning flexibility. Proximity to the rider increases the power efficiency of the system because in the free field, for a point source, the sound pressure level is approximately equal to one divided by the distance between the source and the ear of the listener. Thus the closer the ear is to the source the higher is the SPL. Directional acoustic radiating device 130 includes separate drivers 132 and 142. One side (in an example, the front side) of driver 132 is acoustically coupled into the interior volume 134 of passive directional device 131 which has a direction of maximum radiation 136. One side (in an example, the front side) of driver 142 is acoustically coupled into the interior volume 144 of passive directional device 141 which has a direction of maximum radiation 146. A third acoustic driver 150 (which in an example is a bass/mid-base driver) is located at or near the distal end 157 of directional acoustic radiating device 130 and radiates front side acoustic energy 152 from a front side into the environment. Driver 150 is configured to radiate its rear side acoustic energy from its rear side into and along waveguide 154 that is located between passive directional devices 131 and 141. Waveguide 154 conducts sound along path 151 and has sound outlet 156 that is also located at or near directional acoustic radiating device distal end 157.

Figure 7:
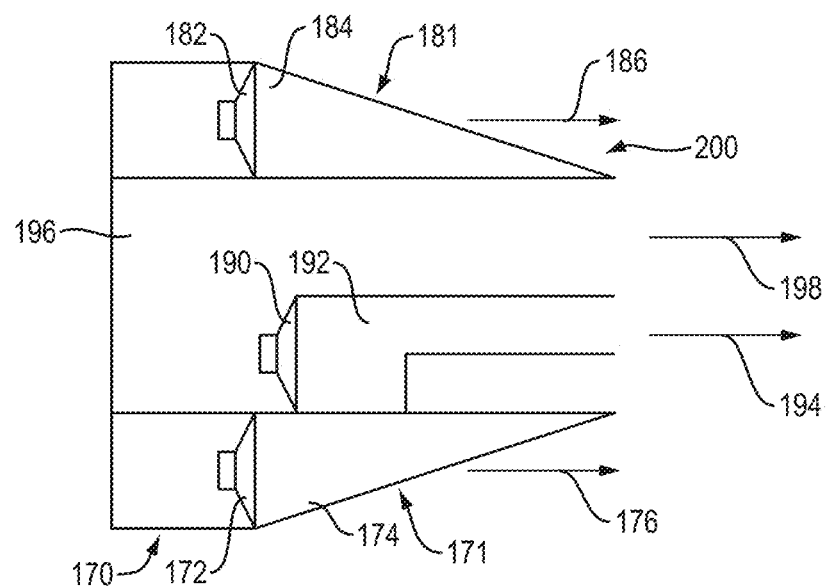
FIG. 7 is a schematic diagram of a directional acoustic radiating device.

An alternative directional acoustic radiating device 170, FIG. 7, accomplishes a different dual band system where all of the drivers are located at one side (the bottom side) of the directional acoustic radiating device. In this example there can be two full-range drivers that are capable to play mid-range frequencies, and a bass driver that is loaded from both sides with waveguides. These two waveguides may have additional volumes that allow the bass system to be tuned to different performance parameters. The length of the waveguides is dictated by the design requirements of the micro-mobility device, and the cross section and volumes of the waveguides tune the desired resonances for the best sound reproduction. Directional acoustic radiating device 170 includes drivers 172, 182, and 190. In an example drivers 172 and 182 are full-range drivers that each couple their front side acoustic energy into interior volumes 174 and 184 of passive directional devices 171 and 181, respectively. Passive directional device 171 has a direction of maximum radiation 176 and passive directional device 181 has a direction of maximum radiation 186. Bass driver 190 is loaded on its front side with waveguide 192 with sound outlet 194 and is loaded on its back side with waveguide 196 with sound outlet 198. Outlets 194 and 198 are proximate one another and in an example are at or close to the distal end 200 of the directional acoustic radiating device. All of the sound is directed toward the expected location of the head/ears of the user.

In the examples illustrated in FIGS. 6 and 7 the two drivers for the passive directional devices can be configured to play left and right channel audio, in which case the directional acoustic audio device can be configured such that the directions of maximum radiation of the two passive directional devices can be pointed generally at the expected locations of the two ears, where left channel audio is delivered toward the left ear and right channel audio is delivered toward the right ear.

In some examples, such as illustrated in FIGS. 5-7, the directional acoustic radiating device can comprise two separate passive directional devices that are coupled together in an assembly. Each passive directional device has its distal end spaced from its acoustic driver, and the two distal ends are proximate one another. Another example could be two of the directional acoustic radiating devices illustrated in FIG. 1 coupled together into an assembly that is configured to be carried by or at least partially integrated into the mechanical structure of the micro-mobility device. In an example the audio signals provided to the two drivers can be controlled such that the phases of the drivers can be manipulated. Also, in an example the directional acoustic radiating device can further include one waveguide that is acoustically coupled to one of the drivers and that comprises an outlet opening located proximate the distal ends of the two passive directional devices, and a second waveguide that is acoustically coupled to the second driver and comprises an outlet opening located proximate the distal ends of the two passive directional devices. Or, the drivers of both directional acoustic radiating devices can radiate their back side radiation into a single common waveguide such as shown in FIG. 5.

Figure 8:
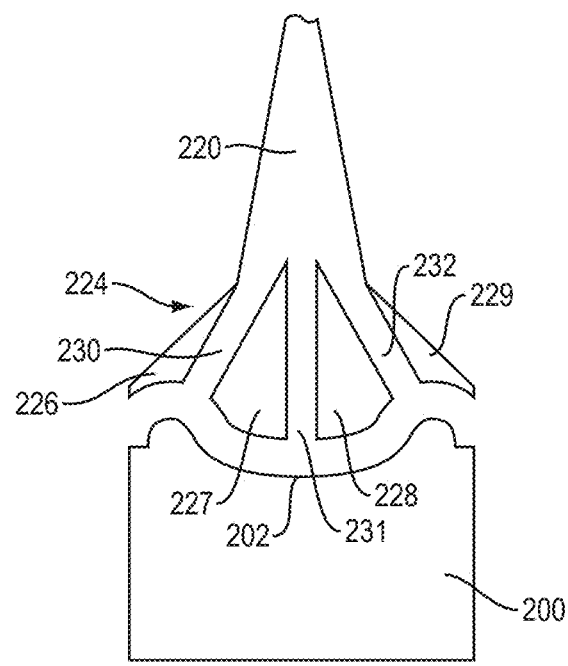
FIG. 8 is a schematic cross-sectional diagram of a phase plug for a directional acoustic radiating device.

FIG. 8 illustrates the use of a phase-plug between the driver and the passive directional device. A phase-plug is a known device that can be used to match the impedance of a driver to the impedance of a passive directional device, which increases the operational efficiency of the driver. A phase plug can be used in any example of the present directional acoustic radiating device and with any one or more of the drivers of the passive directional devices. Phase plugs are described in the U.S. Patent Application that is incorporated herein by reference. Driver 200 includes radiating surface 202. Phase plug 224 is located between radiating surface 202 and passive directional device 220 and comprises a series of openings 230, 231, and 232 that are each smaller than the area of the driver and smaller than the cross-section of passive directional device 220. These openings are defined by solid volumes 226, 227, 228, and 229.

Figure 9:
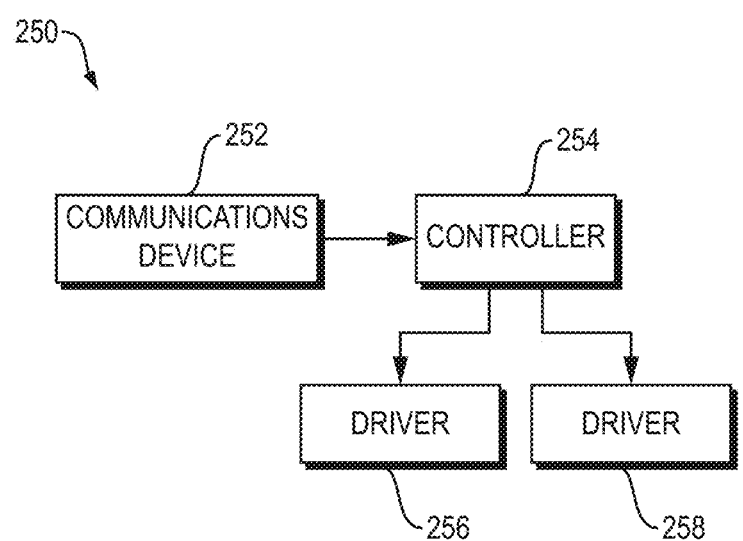
FIG. 9 illustrates active components of a system that includes two audio drivers.

FIG. 9 illustrates the active elements of a system 250 that includes two separate drivers 256 and 258. Communications device 252 is configured to receive audio signals. Their receipt is typically accomplished wirelessly, using any available wireless standard such as Bluetooth. In an example when the system is used with a micro-mobility device, audio signals can be received from a user's mobile device. Audio signals are provided to controller 254 which can be enabled to control the phase of signals provided to drivers 256 and 258.

Figure 10:
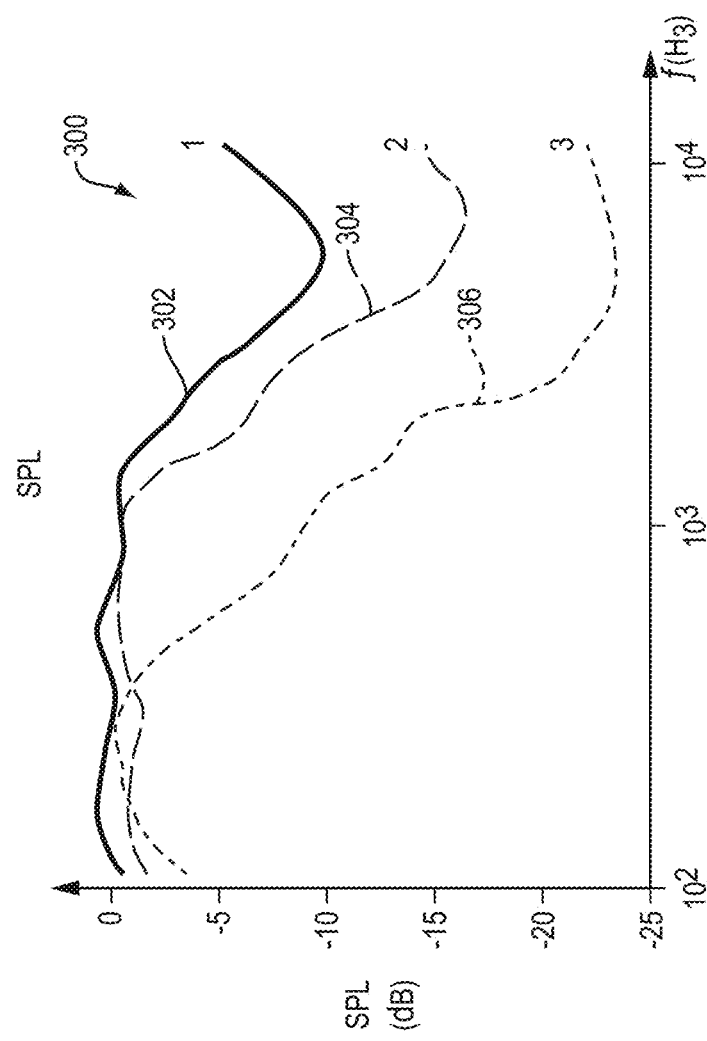
FIG. 10 is a plot of the sound pressure level at various frequencies at three separate locations with respect to a directional acoustic radiating device.

FIG. 10 is a plot 300 of the sound pressure level (SPL (dB)) at various frequencies in the range of 100-10,000 Hz) at three separate locations close to the output of a directional acoustic radiating device such as that illustrated in FIG. 2. Plot line 302 (a solid line) illustrates the SPL on axis 52, two feet away from passive directional device 40 distal end 51. With distal end 51 at the top of the handlebar stem of a motorized scooter it is expected that the user's head will be located approximately two feet from distal end 51. Plot line 302 thus represents the SPL that a typical user might hear. Plot line 304 (a dashed line) illustrates the SPL two feet off of axis 52, and two feet away from passive directional device 40 distal end 51, which represents a person standing or riding another scooter two feet away from the user of the scooter. Plot line 306 (a line with long dashes) illustrates the SPL four feet off of axis 52, and two feet away from passive directional device 40 distal end 51, which represents a person standing or riding another scooter four feet away from the user of the scooter. As can be seen the spilled sound (i.e., the sound off-axis) drops dramatically as the location moves off-axis. The directional acoustic radiating device is thus an effective directional device when carried by the mechanical structure of a micro-mobility device.

Figure 11A:
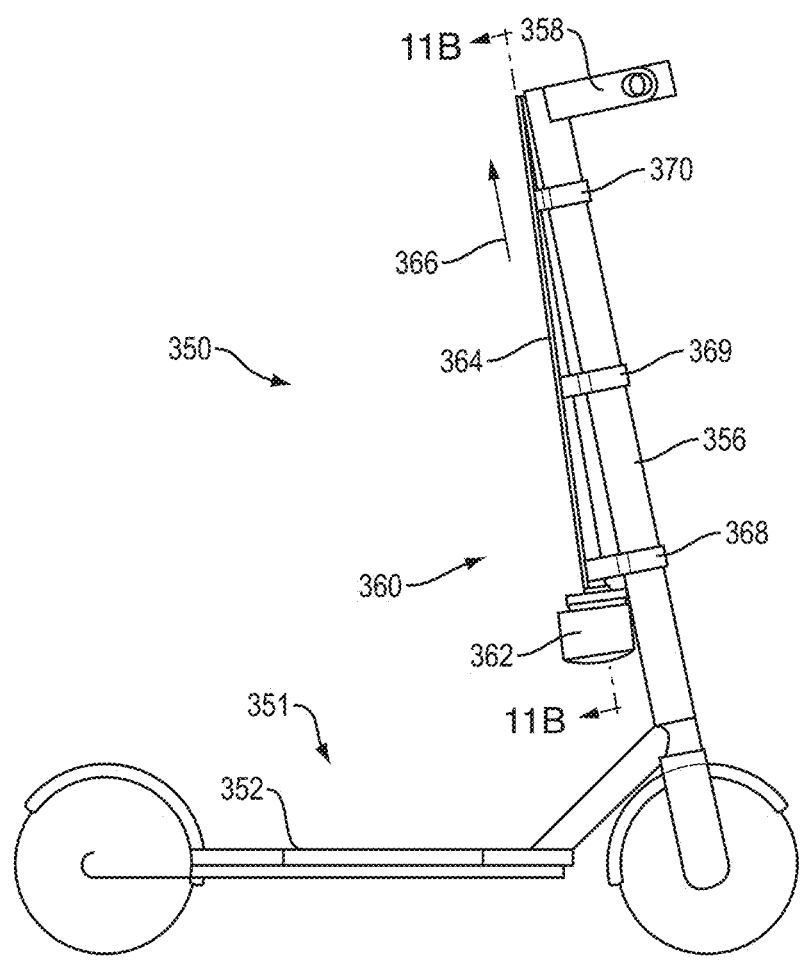
FIG. 11A illustrates a directional acoustic radiating device carried by the handlebar stem of a motorized scooter and FIG. 11B is a cross-section taken along line 11B-11B, FIG. 11A.
Figure 11B:
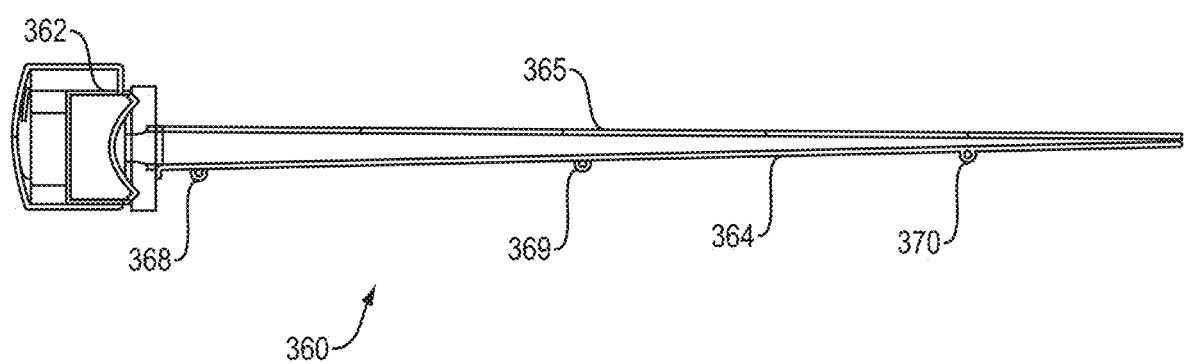
Figure 12C:
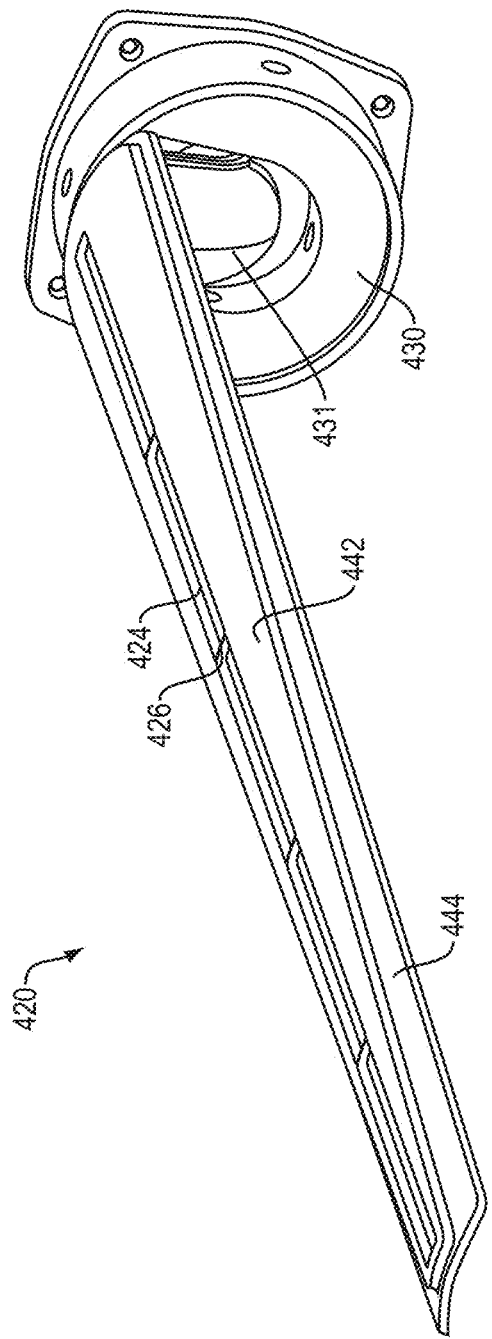
Figure 12D:
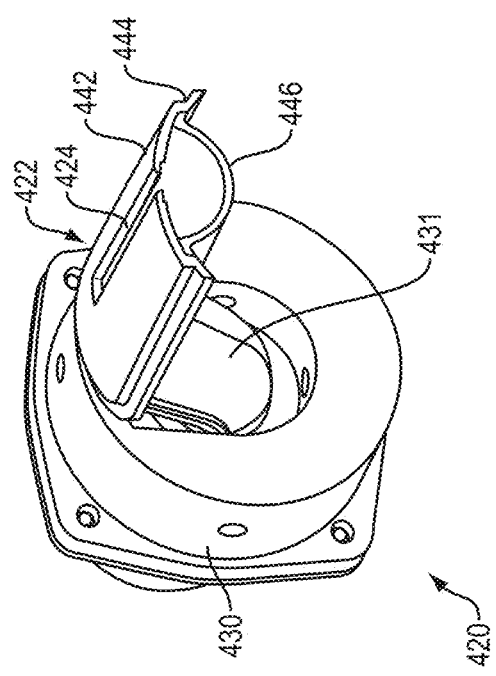

FIGS. 11A and 11B illustrate a directional acoustic radiating device that is fixed to the handlebar stem of a motorized scooter. System 350 includes micro-mobility device 351 (a motorized scooter) that is configured to support a user on a mechanical structure of the micro-mobility device, and a directional acoustic radiating device 360 that is carried by the mechanical structure of the micro-mobility device. Scooter 351 includes deck 352, handlebar stem 356, and handlebars 358. Directional acoustic radiating device 360 includes an acoustic driver 362 that is acoustically coupled to a passive directional device 364 so as to radiate acoustic energy into the passive directional device 364. The passive directional device 364 has an opening 365 along the length of a perimeter of passive directional device 364 through which acoustic energy is radiated to the environment, to provide a direction of maximum radiation 366 of the passive directional device. In an example opening 365 extends along most or all of the length of passive directional device 364. Straps or clips 368, 369, and 370 are carried by or coupled to passive directional device 364 and clip to, are fixed to, or encircle handlebar stem 356.

FIGS. 12A-12D illustrate a directional acoustic radiating device that is integrated into the handlebar stem of a motorized scooter or other type of micro-mobility device. Directional acoustic radiating device 420 includes acoustic driver 430 and passive directional device 422. Since driver 430 has a diameter that is about the same as that of handlebar stem 430, curved hollow tube 431 is included to couple sound pressure from driver 430 into passive directional device 422. In this example passive directional device 422 includes top member 442 that has a radius of curvature that is the same as that of the hollow tube that comprises handlebar stem 402, so that it can sit against the outside of part of stem 402. Bottom member 446 creates the rest of the hollow passive directional device 422. Shoulder area 444 of top member 442 accommodates the handlebar stem, which has a cutout (not visible) into which top member 442 fits. Elongated opening 424 (which in an example has a constant width) carries a resistive screen (not shown). Opening 424 may be continuous or not. In the present example it is almost continuous but small reinforcing sections 426 are present to maintain the strength of the structure. The length, width and area of opening 424 and the resistivity of the screen are selected to achieve a desired acoustic performance and directivity. In an example opening 424 has a length of about 500 mm and a constant width of about 3.5 mm, while screen 425 has a resistivity of about 2000 Rayl. Fasteners 451, 452, and 453 are used to fix directional acoustic radiating device 420 in handlebar stem 402.

A number of implementations have been described. Nevertheless, it will be understood that additional modifications may be made without departing from the scope of the inventive concepts described herein, and, accordingly, other examples are within the scope of the following claims.

What is claimed is:

1. A system, comprising:
a micro-mobility device that comprises a deck that is configured to support a user and a tubular handlebar stem with an interior, and extending upward of the deck to an upper end spaced farthest from the deck, the stem having a length, lying along a stem longitudinal axis, and having an elongated opening along its length; and
an elongated directional acoustic radiating device carried by the stem of the micro-mobility device and comprising a first acoustic driver that is acoustically coupled to an interior of a first passive directional device so as to radiate acoustic energy into the interior of the first passive directional device at an end of the first passive directional device that is closest to the deck of the micro-mobility device, wherein the first passive directional device is located in the interior of the stem with a distal end located proximate the upper end of the handlebar stem and comprises a top member that defines a long, narrow continuous or non-continuous sound-emitting opening along a length of the first passive directional device and that is aligned with the elongated stem opening, wherein acoustic energy from the sound-emitting opening is radiated into an environment proximate the stem, to provide a direction of maximum radiation of the first passive directional device that is generally parallel to the longitudinal axis of the stem and pointed toward a location above the stem, and wherein the top member of the first passive directional device further defines a recess into which the stem proximate the elongated stem opening is configured to fit.

2. The system of claim 1, wherein the micro-mobility device comprises a motorized scooter.

3. The system of claim 1, further comprising a phase plug located between the first acoustic driver and the first passive directional device to better match an impedance of the first acoustic driver to an impedance of the first passive directional device.

4. The system of claim 1, wherein the first acoustic driver radiates front side acoustic energy from a front side and rear side acoustic energy from a rear side, and wherein the front side acoustic energy is radiated into the first passive directional device.

5. The system of claim 4, wherein the directional acoustic radiating device further comprises a waveguide that receives rear side acoustic energy.

6. The system of claim 5, wherein the waveguide comprises an outlet opening located proximate the distal end of the first passive directional device.

7. The system of claim 4, further comprising a second acoustic driver that is acoustically coupled to a second passive directional device so as to radiate acoustic energy into the second passive directional device, wherein the second passive directional device comprises a long, narrow continuous or non-continuous sound-emitting opening in a perimeter of the second passive directional device that extends along a length of the second passive directional device and through which acoustic energy is radiated to the environment to provide a direction of maximum radiation of the second passive directional device, wherein the direction of maximum radiation of the second passive directional device is pointed generally at an expected location of the head of the user of the micro-mobility device.

8. The system of claim 7, wherein the direction of maximum radiation of the first passive directional device is pointed generally at an expected location of a first ear of the user, and the direction of maximum radiation of the second passive directional device is pointed generally at an expected location of a second ear of the user.

9. The system of claim 7, wherein the second acoustic driver radiates front side acoustic energy from a front side and rear side acoustic energy from a rear side, and wherein the front side acoustic energy is radiated into the second passive directional device.

10. The system of claim 9, wherein the directional acoustic radiating device further comprises a waveguide that receives rear side acoustic energy from the first and second drivers.

11. The system of claim 10, wherein the second passive directional device has a distal end spaced from the second acoustic driver and located proximate the distal end of the first passive directional device, and wherein the waveguide comprises an outlet opening located proximate the distal ends of the first and second passive directional devices.

12. The system of claim 11, wherein the waveguide is located between the first passive directional device and the second passive directional device.

13. The system of claim 12, further comprising a controller that is configured to manipulate a phase of the acoustic energy radiated by the first and second drivers such that the first and second drivers are in phase at low frequencies.

14. The system of claim 9, further comprising a third acoustic driver that radiates front side acoustic energy from a front side and rear side acoustic energy from a rear side, and wherein the rear side acoustic energy from the third acoustic driver is radiated into a first waveguide that is located between the first and second passive directional devices.

15. The system of claim 14, wherein the front side acoustic energy from the third acoustic driver is radiated into a second waveguide that is located between the first and second passive directional devices.

16. The system of claim 15, wherein the second passive directional device has a distal end spaced from the second acoustic driver and located proximate the distal end of the first passive directional device, and wherein the first waveguide comprises an outlet opening located proximate the distal ends of the first and second passive directional devices, and wherein the second waveguide comprises an outlet opening located proximate the distal ends of the first and second passive directional devices.

17. The system of claim 1, wherein the stem has a radius of curvature, wherein the top member of the first passive directional device has a radius of curvature that is the same as that of the stem, and wherein the recess of the top member of the first passive directional device into which the stem proximate the elongated stem opening is configured to fit comprises a shoulder in the top member of the first passive directional device.

18. A system, comprising:
a micro-mobility device that comprises a deck that is configured to support a user and a tubular handlebar stem with an interior, and extending upward of the deck to an upper end spaced farthest from the deck, the stem having a length, lying along a stem longitudinal axis, and having an elongated opening along its length; and
an assembly carried by the stem of the micro-mobility device, the assembly comprising
a first acoustic driver that is acoustically coupled to an interior of a first passive directional device at an end of the first passive directional device that is closest to the deck of the micro-mobility device so as to radiate acoustic energy into the interior of the first passive directional device, wherein the first passive directional device is located in the interior of the stem with a distal end located proximate the upper end of the handlebar stem and comprises a top member that defines a long, narrow continuous or non-continuous sound-emitting opening along a length of the first passive directional device and that is aligned with the elongated stem opening, wherein acoustic energy is radiated into an environment proximate the stem, to provide a direction of maximum radiation of the first passive directional device that is generally parallel to the longitudinal axis of the stem and pointed toward a location above the stem, and wherein the top member of the first passive directional device further defines a recess into which the stem proximate the elongated stem opening is configured to fit, and
a second acoustic driver that is acoustically coupled to an interior of a second passive directional device at an end of the second passive directional device that is closest to the deck of the micro-mobility device so as to radiate acoustic energy into the interior of the second passive directional device, wherein the second passive directional device comprises a long, narrow continuous or non-continuous sound-emitting opening along a length of the second passive directional device and that extends along part of the length of the stem, wherein acoustic energy is radiated into the environment proximate the stem, to provide a direction of maximum radiation of the second passive directional device that is generally parallel to the longitudinal axis of the stem and pointed toward a location above the stem; and
a controller that is configured to manipulate a phase of the acoustic energy radiated by the first and second drivers.

19. The directional acoustic radiating device of claim 18, wherein the assembly further comprises a waveguide that receives acoustic energy from at least one of the first and second drivers.

* * * * *